April 8, 1958

D. E. KREHBIEL 2,829,579

WEED CLEARING DEVICE FOR PLOWS

Filed Oct. 14, 1953

INVENTOR.
DANIEL E. KREHBIEL
BY

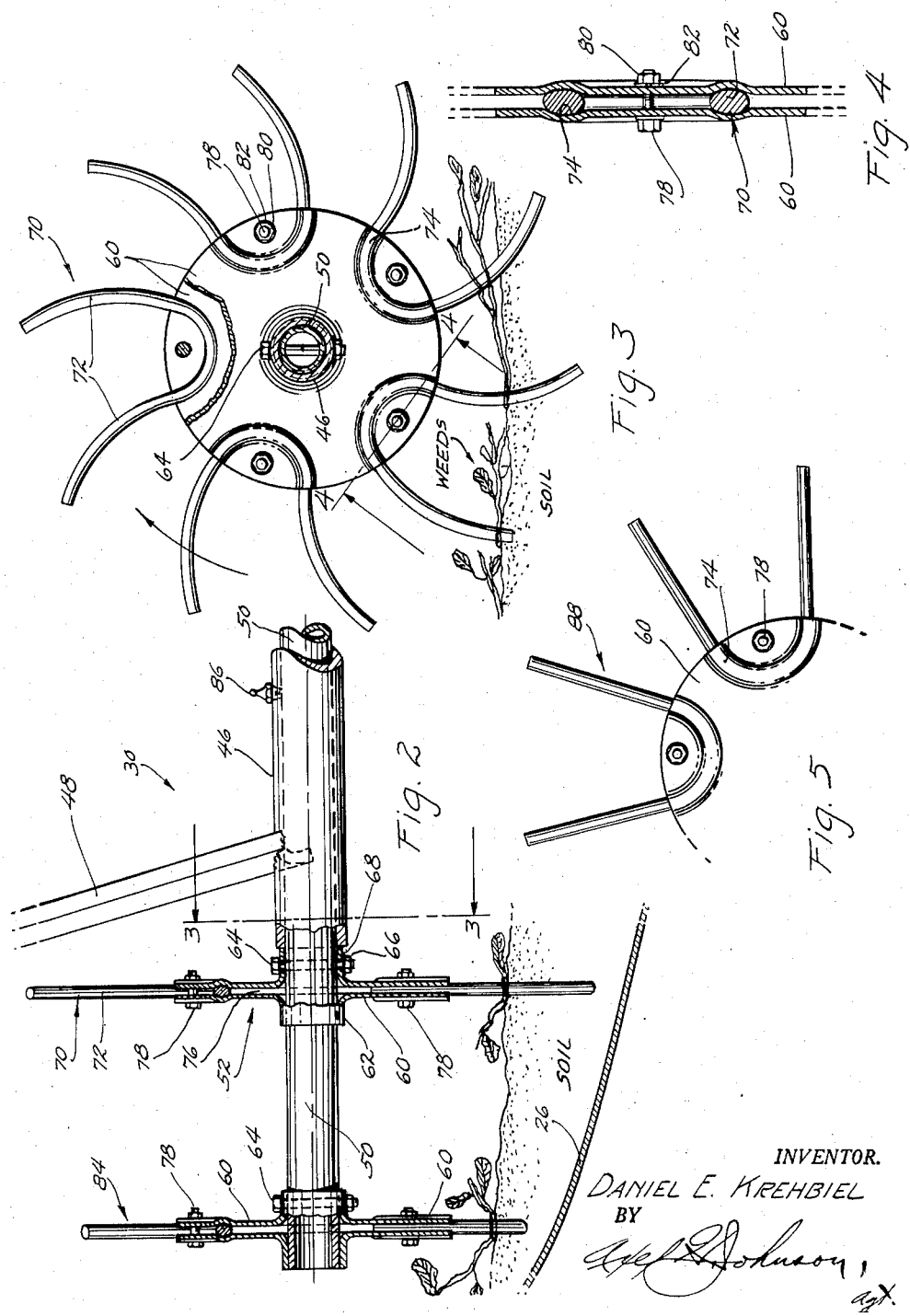

United States Patent Office 2,829,579
Patented Apr. 8, 1958

2,829,579
WEED CLEARING DEVICE FOR PLOWS

Daniel E. Krehbiel, Pretty Prairie, Kans.

Application October 14, 1953, Serial No. 386,042

3 Claims. (Cl. 97—194)

This invention relates to a means of preventing weeds and trash from accumulating on the plow beams and the leading edges of mold board plows and specifically to a device which is self-operating and which can be moved into a nonoperating position when not needed.

When plowing fields, which have a considerable amount of weeds and other growth thereon, it has been found that this growth constantly loops or drapes itself about the plow beams and leading edge of the plowshare, and accumulates to such an extent as to cause considerable trouble, in that its presence increases the resistance of the plow through the earth and therefore requires considerably more power to turn the furrow. Such a condition hinders the proper turning of the soil and also results in large accumulations of weeds at intervals along the field when the accumulation is accidentally dislodged. It is desired that weeds be mixed with the turning earth as the furrow is being made, so that there will be no excessive accumulation over any one section of the field. In this way, decay is hastened and the field is in better condition for planting.

In the past, it has been the practice of some farmers to provide a man to ride the plow and dislodge the accumulation of weeds and straw constantly from the leading edges of the plowshares as it accumulates. By doing this constantly, the straw or weeds will be deposited more or less uniformly upon the surface of the ground and be allowed to decay and become part of the soil. The provision of the man to ride the plow endangers him, and requires the time of one who could be doing other work around the farm and therefore would be a wasteful operation. This method of dislodging weeds from the plow is not the final answer to the problem, as weeds so dislodged usually are deposited on top of the furrow and are not turned under, therefore, they do not decay as rapidly as desired.

This invention is novel in that it pins weeds, straw, and other growth to the surface of the soil as the latter moves rearwardly over the plowshare. As the furrow is turned, this growth is covered by the soil and therefore will decay quickly. This invention also assures that the weeds and other growth will not lie on the surface of the field and interfere with subsequent operations such as harrowing, planting, and cultivating.

This invention is shown mounted on a two-bottom wheel plow of the conventional type, but it is conceivable that the device is adaptable to any plow having the conventional bottoms and requires only a place on which to mount the device.

Referring to the drawings:

Fig. 2 is a fragmentary enlarged view of a portion of the invention.

Fig. 3 is a section taken at 3—3 of Fig. 2.

Fig. 4 is a section taken at 4—4 of Fig. 3.

Fig. 5 shows a fragmentary view of a modified form of the invention.

Figure 1:
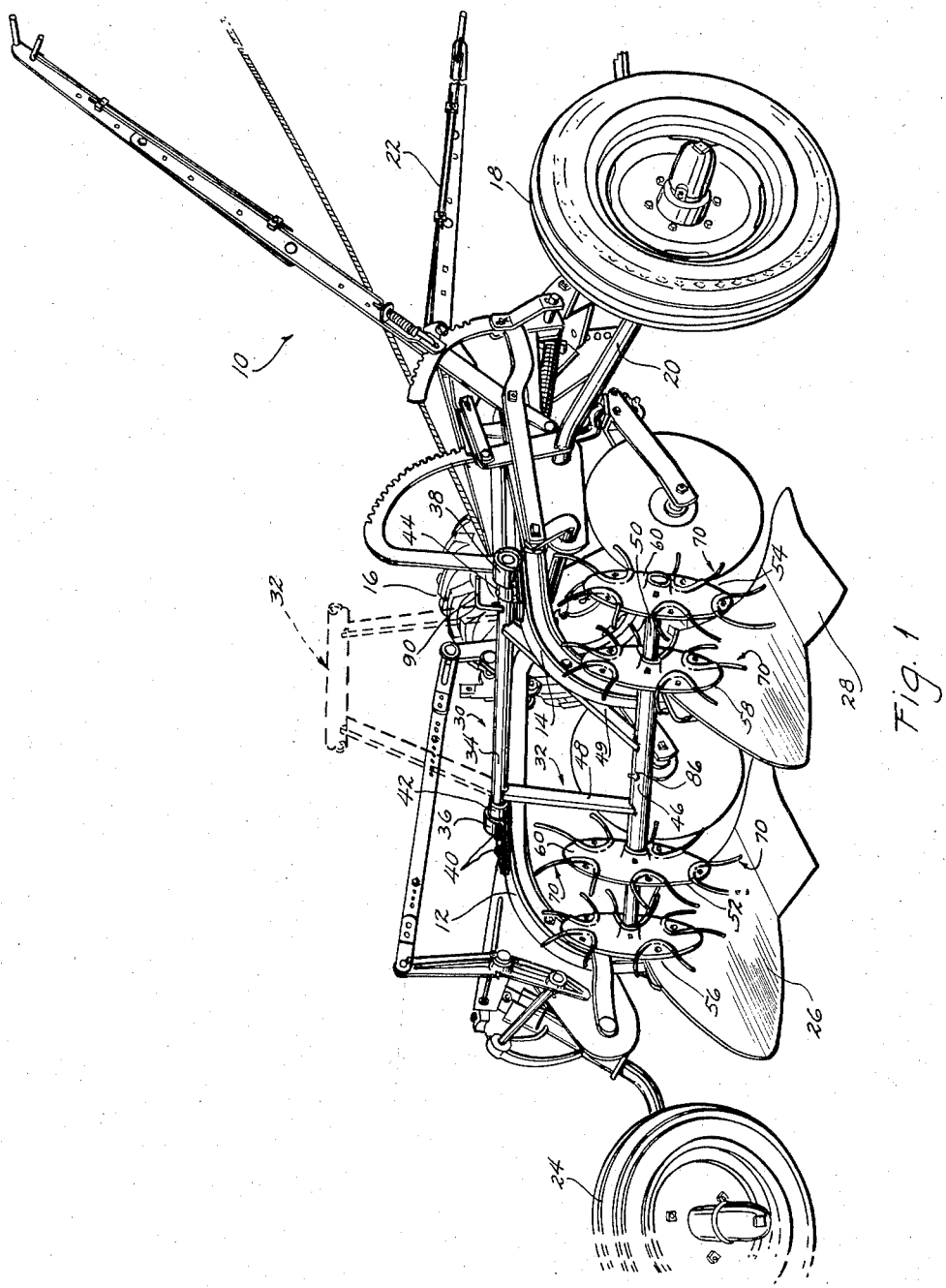
Fig. 1 is a perspective elevational rear view of a typical two-bottom plow, with the invention mounted thereon.

Referring to Fig. 1, the plow 10 comprises the usual frame members and carries a pair of plow beams 12 and 14. These plow beams extend forwardly in the general direction of travel of the plow. A pair of wheels 16 and 18 support the forward end of the plow and are connected to the frame by a conventional crank axle 20. The usual means of raising and lowering the shares relative to the ground is indicated at 22 and comprises a lever which engages the crank axle 20 and is in convenient reach of the tractor operator. Rearwardly of the frame, is a land side wheel 24 which resists the thrust of the plowshares against the wall of the furrow. These details of the plow are conventional and will not be referred to unless necessary in order to properly describe the invention.

Referring again to Fig. 1, a pair of plowshares 26 and 28 are secured in the conventional manner to the beams 12 and 14 respectively. The weed cleaning device 30 comprises a bracket member 32 pivotally supported on beams 12 and 14. A tubular member 34 extends transversely of the plow beams 12 and 14 and is journaled in a pair of bearings 36 and 38. Bearings 36 and 38 are bolted to the upper surface of the respective beams 12 and 14 by bolts or cap screws 40. Suitable collars 42 and 44 are fitted over tubular member 34 and are welded or otherwise secured to the latter in a position so as to coact with the inner faces of bearing members 36 and 38, in order to prevent axial movement of member 34. Spaced rearwardly from member 34 and positioned generally over the plow bottoms 26 and 28 is a tubular bearing member 46. The axis of member 46 is generally parallel to the axis of member 34 and is of a suitable length for the purpose. Rearwardly extending arms 48 and 49 are welded or otherwise secured to the member 34 and in this instance, they converge toward member 46 and are welded or otherwise secured thereto. A tubular shaft 50, in this instance, is journaled within tubular member 46 and extends beyond the ends of the latter a suitable distance for reasons which will appear.

The gist of this invention is a plurality of rotating spider members 52, 54, 56, and 58, two for each plowshare 26 and 28. It is also contemplated to employ only one spider for each plowshare in some instances, and it is not desired to confine the use of this invention to a plurality of spiders over each share. These spider members are mounted, as shown in Fig. 1, integrally with the shaft 50. Figs. 2, 3, and 4 show the spider member in more detail. Reference to the drawings will indicate that spider members 52 and 54 are of larger diameter than spider members 56 and 58. The reason for this difference in diameter, is to permit the spiders to conform generally to the contour of the plow bottoms 26 and 28 which is clearly shown in Fig. 2. Spiders 52 and 58 are positioned on said shaft adjacent each end of the bearing member 46, and prevent excessive end play of the shaft 50, while spider members 54 and 56 are positioned at the extreme ends of shaft 50. Each pair of spiders are spaced apart a suitable distance so as to function properly.

Figs. 2, 3, and 4 show clearly the construction of the spiders and their mounting on shaft 50. The construction of the four spider members is identical, with the exception of the lengths of the spring fingers. Each spider comprises a pair of flanges 60 which are positioned with their hub portions 62, as shown in Fig. 2, so that when they are secured together face to face they will form a rigid hub assembly. A bolt 64 is passed through one hub portion of each spider and also passes through the tubular shaft 50. A nut 66 and a lock washer 68 secures the spider to the shaft.

Spaced equally about the periphery of the flanges 60, is a plurality of outwardly extending finger units 70. In this instance, the finger units have individual finger portions 72 which are preferably curved so as to aid in clearing them of any weeds or growth that may have become draped upon them. Each finger unit 70 is a unitary structure and is bent, as shown in Fig. 2, and results in a pair of resilient fingers. Flanges 60 are formed with arcuate depressions, such as at 74, which have internal contours which fit the contour of the finger units 70. Arcuate depressions 74 are of a depth sufficient to secure the finger members 70 against displacement and to also allow a space 76 between the flanges in order to allow for compressing the latter together so that the finger units 70 will be rigidly held. A bolt 78 is positioned within each arcuate portion 74 and passes through both flanges 60 of each spider. A nut 80 and lock washer 82 provide the means of clamping the flanges 60 together at each finger unit. There is sufficient resiliency in the flanges 60 to securely hold the finger unit 70 in place between them when the nut 80 is tightened. The only difference between the spiders 52 and 54 and 56 and 58 is with regard to the length of the fingers. Finger units 84 of spider members 56 and 58 are identical with finger units 70, except that the units 84 have shorter fingers so as to conform to the contour of the plow bottom. A grease fitting 86 is provided in tubular bearing member 46 and provides a means of lubricating the shaft 50.

It may be found that straight finger units 88, as shown in Fig. 5, are suitable in some instances, and if suitable will be found to be cheaper to produce. However the means of construction and mounting is otherwise identical with that of the curved fingers.

There may be instances, where the condition of the field does not require use of the weed clearing device and it is then desirable to be able to swing the unit out of the operating position. This inoperative position is shown in dotted lines in Fig. 1. In this instance, it is merely necessary to swing the bracket 32 upwardly. In order to properly support the bracket in the upward position, a suitable stop member 90 is provided which is welded or otherwise secured to tubular member 34. When the bracket 32 is in its upward inoperative position, the stop member 90 will rest on the upper surface of plow beam 14 thereby supporting the complete unit when not in use. It is evident that the complete unit can be removed from the plow by merely removing the bolts 40.

Fig. 1 shows the plow clearing device in its operative position when it is desired to plow a field having weeds and other undesirable growth which is to be plowed under. As the plow is traversed along the field with the plow bottoms 26 and 28 at their proper depth, spiders 52, 54, 56, and 58 will roll on the surface of the soil as the latter passes over the plow bottoms. Fingers 72 and 84 may penetrate the earth to a depth where the periphery of the flanges 60 will roll on the earth. It is clear that the earth moving rearwardly over the plowshares will tend to rotate the spiders because the fingers thereof are "geared" to the ground, the depth of penetration of the fingers being dependent upon the hardness of the ground. Any weeds or growth passing rearwardly, will be pinned to the earth by the fingers and thereby carried rearwardly away from the leading edge of the plow bottoms. Simultaneously with the movement of the earth rearwardly, the trash and growth on the surface will be covered by the furrow as it rolls over the plowshare, thus completely covering the weeds and growth so that it will not be exposed but will be covered and decay rapidly.

It has been found that the curved fingers have less of a tendency to pick up weeds thereon than the straight fingers, but there may be instances where the straight fingers are satisfactory.

It is within the contemplation of this invention to use this device on a one-bottom plow as well as multiple bottom implements. The change being namely in the design of the bracket and the number of spiders required.

Various modes of carrying out the invention may be employed within the scope of the accompanying claims, which particularly point out and distinctly set forth the subject matter regarded as the invention.

What is claimed is:

1. In a plow comprising a frame and a plurality of plowshares, in combination, a means of clearing weeds from said shares during plowing comprising a substantially-horizontally-disposed shaft journaled on said frame and having its axis positioned substantially perpendicularly with respect to the flow of earth over said shares, and a pair of spaced earth engaging spiders secured to said shaft over each of said shares and having peripherally spaced fingers to penetrate the earth passing over said shares and be rotated by contact with said earth, and holding weeds in contact with said earth, said fingers having tips, that upon rotation, extend into immediate proximity to the surface of said shares at some position of rotation.

2. In a plow comprising a frame and a plowshare, in combination, a means of clearing weeds from said share during plowing, comprising a shaft journaled substantially horizontally on said frame and positioned with the axis thereof normal to the direction of movement of soil passing over said share, a pair of earth engaging spiders rotated by contact with said earth and spaced on said shaft over said share and provided with peripherally spaced fingers, said fingers having tips, that upon rotation, extend into immediate proximity to the surface of said share at some position of rotation.

3. In a plow having a plow beam and a share secured thereto, a means of clearing weeds from the said share comprising a pivoted support frame journaled on said beam and extending rearwardly and terminating in a bearing portion having the axis thereof positioned horizontally normal to the direction of flow of earth passing over said share, a shaft member rotatable in said bearing portion and extending therefrom, a pair of spider members secured to said shaft and spaced apart over said share, said spider members having fingers whose tips are disposed at such varying distances from said axis that all of said tips extend into immediate proximity to the plow share at some position of rotation, said spiders so positioned as to ride over the soil passing over the share during plowing and be rotated by contact with said soil.

References Cited in the file of this patent

UNITED STATES PATENTS

| | | |
|---|---|---|
| 645,597 | Keller et al. | Mar. 20, 1900 |
| 1,249,555 | Townsend | Dec. 11, 1917 |
| 1,297,377 | McGirr | Mar. 18, 1919 |
| 1,537,418 | De Weese | May 12, 1925 |
| 1,691,352 | Hicks | Nov. 13, 1928 |
| 1,731,356 | Smith | Oct. 15, 1929 |
| 1,852,908 | Vise | Apr. 5, 1932 |
| 1,935,199 | Albrecht | Nov. 14, 1933 |
| 2,066,487 | Schlensker | Jan. 5, 1937 |
| 2,311,945 | Kelly | Feb. 23, 1943 |
| 2,406,500 | Karl | Aug. 27, 1946 |